May 26, 1970 HUGUETTE RODOT BORN FUMERON ET AL 3,514,347

PROCESS OF PREPARING A p-n JUNCTION IN SEMICONDUCTOR ALLOYS OF MERCURY TELLURIDE AND CADMIMUM TELLURIDE

Filed May 25, 1967 3 Sheets-Sheet 1

United States Patent Office 3,514,347
Patented May 26, 1970

3,514,347
PROCESS OF PREPARING A p-n JUNCTION IN SEMICONDUCTOR ALLOYS OF MERCURY TELLURIDE AND CADMIUM TELLURIDE

Huguette Rodot, born Fumeron, and Christian Verie, Bellevue, France, assignors to Centre National de la Recherche Scientifique, Paris, France, a French government administration Filed May 25, 1967, Ser. No. 641,356
Claims priority, application France, May 27, 1966, 63,376
Int. Cl. H01l 7/62
U.S. Cl. 148—186 7 Claims

ABSTRACT OF THE DISCLOSURE

Process of preparing a p-n junction in semiconductor alloys of mercury telluride and cadmium telluride of general formula $Hg_{1-x}Cd_xTe$ where $x$ is comprised between 0 and 0.4. In this process, a previously purified monocrystalline sample of the alloy is first subjected to a heat treatment to obtain a standard reference sample of type n. This sample of type n is subjected to a further heat treatment, of short duration, at a high temperature, to obtain, in a reproducible manner, a sample of type p which is then subjected to a further, longer, heat treatment at a lower temperature to obtain the p-n junction.

Figure 1:
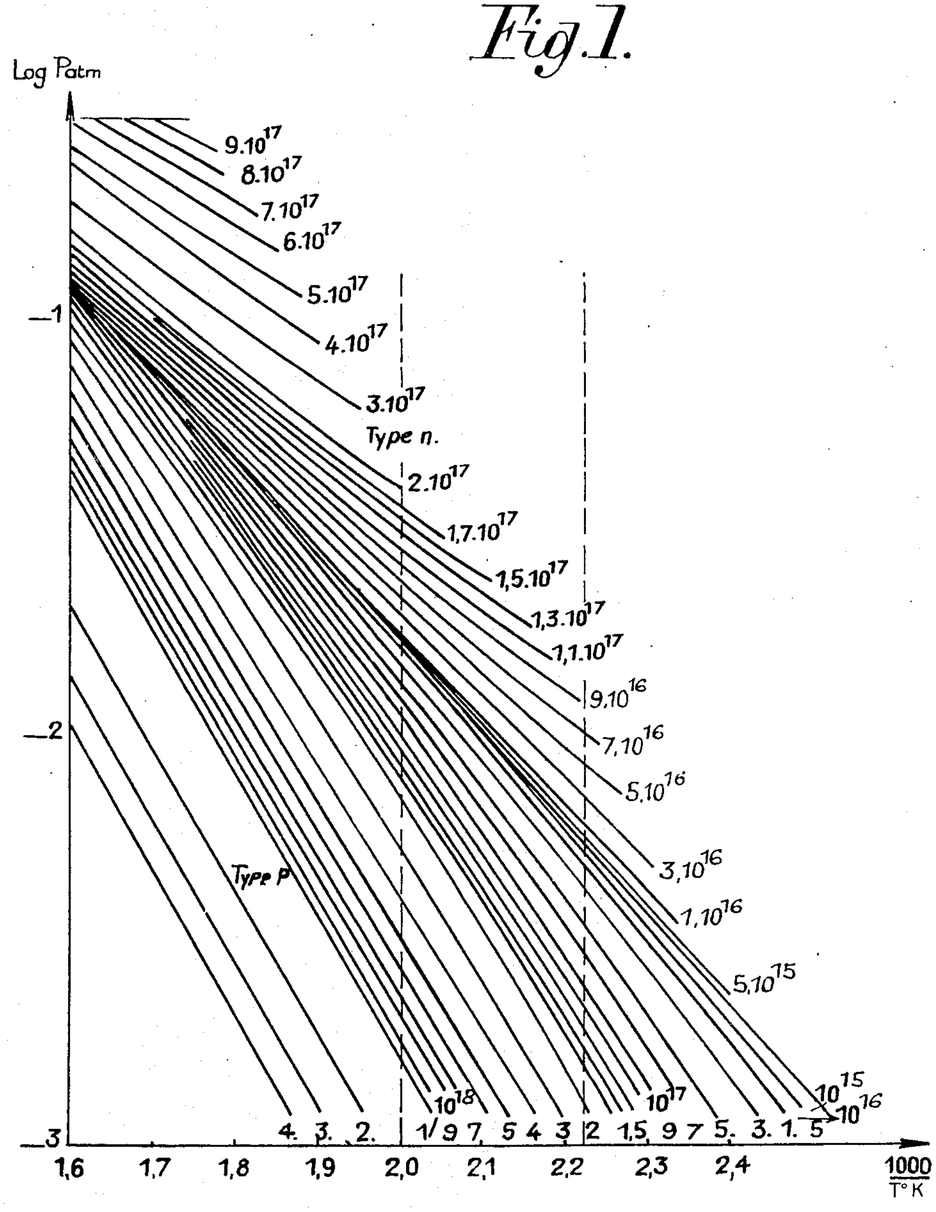

This invention relates to a process of preparing p-n junctions in semiconductor alloys of mercury telluride and cadmium telluride of general formula $Hg_{1-x}Cd_xTe$ where $x$ is comprised between 0 and 0.4, from a previously purified crystalline sample of this alloy.

This process comprises the steps of:

(A) subjecting this sample of the alloy in question to a thermal treatment of duration $t_1$, which increases as a function of the thickness of the sample, at a temperature $T_1$ lower than 350° C. in the presence of mercury vapour at a pressure $P_1$ comprised between $6\times10^{-3}$ and $1.5\times10^{-2}$ atmospheres, to obtain a sample of type n, having a low concentration of charge carriers;

(B) subjecting the sample of type n to a thermal treatment of duration $t_2$ comprised between 1 and 30 minutes, at a temperature $T_2$ greater than 300° C., in the presence of mercury vapour at a pressure $P_2$ comprised between 0.2 and 1 atmosphere, to obtain a sample of type p having a high concentration of charge carriers:

(C) subjecting the sample of type p to a thermal treatment of duration $t_3$ comprised between 1 and 3 hours at a temperature $T_3$ comprised between 300 and 500° C. but lower than the temperature $T_2$, in the presence of mercury vapour at a pressure $P_3$ equals to the equilibrium pressure of the mercury at the temperature $T_3$, to obtain a sample of type p having a junction of type p-n.

Other features of the invention will become apparent from the specific description and examples which will be given later with reference to the accompanying drawings.

Prior to the present invention, it was known that the properties of a sample of type n, such as the sample obtained by step (A) mentioned above, could be changed by reheating this sample for a long duration. However, such long duration reheating does not produce (at least not in a systematically reproducible way) a sample of type p, which is required for preparing a p-n junction. By contrast, the present invention reheats the sample of type n obtained by step (A) for only a short duration (step (B) mentioned above), which thus produces a sample of type p in a systematically reproducible way. The sample of type p thus obtained is further reheated (step (C) mentioned above), but for a longer time and at a lower temperature than was the case with the reheating of step (B), this further reheating producing the p-n junction. Needless to say, both these steps of reheating should be carried out in the conditions of temperature, pressure and atmosphere indicated above.

Although it is very surprising, and seems rather paradoxical, that reheating the sample of type n for only a short duration (only a few minutes) can produce such profound changes in the sample, a tentative physical explanation will be given later in connection with FIG. 2, which explanation is not intended to limit the scope or validity of the present invention in any way, but which should help in the overall understanding of the invention.

The invention will be better understood from the following specific description made with reference to the accompanying drawings, which description and drawings are, of course, merely given by way of example.

Figure 2:
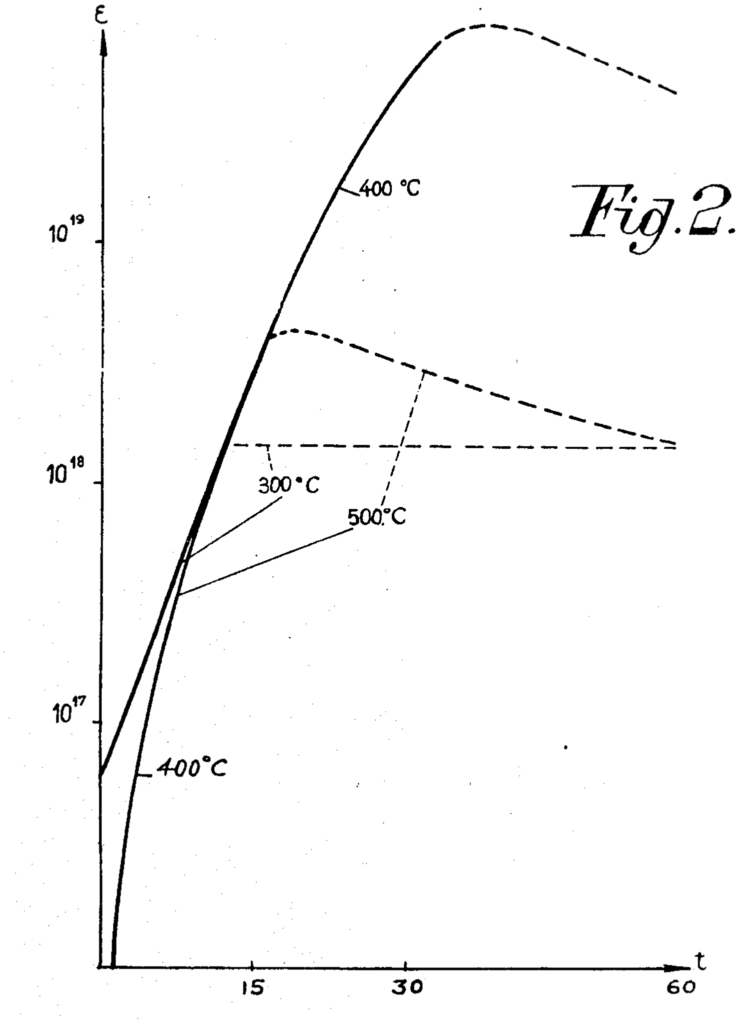
Figure 3:
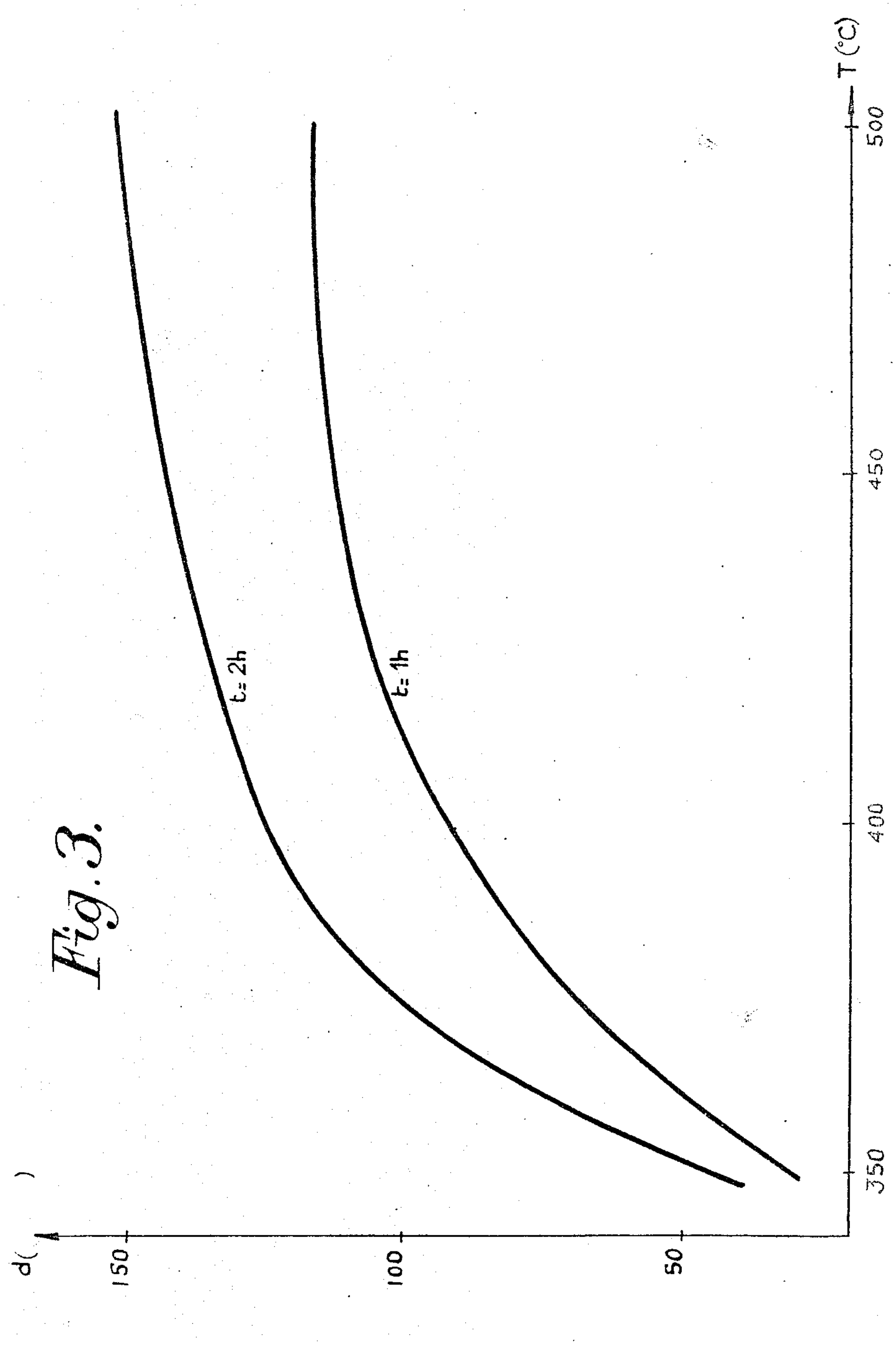

FIGS. 1, 2 and 3 of these drawings are experimental diagrams permitting the above mentioned parameters P, T and $t$ to be determined.

Figure 4:
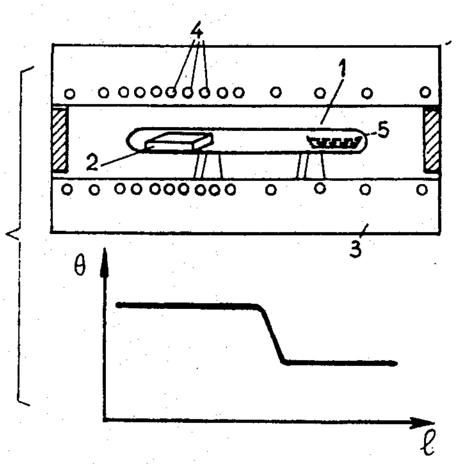

FIG. 4 shows schematically in section an experimental device for carrying out the process of the invention.

The alloys of mercury telluride and cadmium telluride in question are semiconductors operating at wave lengths greater than 3.5 microns and in particular in the range of wave lengths from 9 to 12 microns, which, due to the fact that their intrinsic activation energy $\Delta E$ is lower than 0.4 ev. permits the possibility of using them in the construction of numerous electro-optical or opto-electrical devices.

This value of $\Delta E$, combined with a high electron mobility $\mu$ permits the construction of photoconductor, photomagnetoelectric or photovoltaic detectors, very sensitive to relatively low temperatures (77° K. for example), and having recourse to injection processes, sublaser and laser emitters.

Moreover, the very low value of the effective electron mass $m^x$ (which passes through a minimum for $x$ comprised between 0.13 and 0.18), associated with the properties mentioned above, permits the construction of various types of modulators and amplifiers using piezo-absorption, piezo-reflectivity, photo-absorption, photo-reflectivity or the Franz-Keldysch effect, that is to say the variation of $\Delta E$ by the application of an intense electric field.

In the construction of the devices which have just been mentioned, it is necessary that the alloys of the type in question have been subjected to a good metallurgical control at the moment of their manufacture, and the concentration of charge carriers, which depends in a critical way on the nature and the concentratinon of reticular faults and impurities must previously have been grought to a well determined value.

It is already known how to manufacture, with a satisfactory metallurgical control ,the above mentioned alloys which one finds in commerce. It should be recalled nevertheless that in this manufacturing, the constituents of the alloy are subjected to a purification by zone melting, that is to say the mercury tellurides and the cadmium tellurides taken separately, then, after having formed the alloy, this alloy is subjected to a monocrystallization in the most homogeneous form possible under controlled pressures of mercury vapour and of cadmium vapour.

The monocrystalline samples of formula $Hg_{1-x}Cd_xTe$ available commercially have a variable, and generally high, concentration of electrons and free holes. Thus, for $x$ equals 0.30, the crystals are often of the type p at 77° K. with a concentration of "holes" of $10^{18}$ to $10^{19}$ per cm.$^3$.

In order to control the composition and the concentration of charge carriers in these samples, and to form semiconductor junctions of type p-n with these samples, according to the invention, (A) such a sample is subjected to a thermal treatment of duration $t_1$ which increases as a function of the thickness of the sample, at a temperature $T_1$ lower than 350° C. and preferably in the interval 180–225° C., in the presence of mercury vapour and a pressure $P_1$ comprised between $6\times10^{-3}$ and $1.5\times10^{-2}$ atmospheres, to obtain a sample of type n having a low concentration of charge carriers, (B) the sample of type n thus obtained is subjected to a thermal treatment of duration $t_2$ comprised between 1 and 30 minutes at a temperature $T_2$ greater than 300° C. and preferably in the neighbourhood of 400° C., in the presence of mercury vapour at a pressure $P_2$ comprised between 0.2 and 1 atmosphere, to obtain a sample of type p having a high concentration of charge carriers, (C) this sample of type p is then subjected to a thermal treatment of duration $t_3$ comprised between 1 and 3 hours, at a temperature $T_3$ comprised between 300 and 500° C. but lower than the temperature $T_2$, in the presence of mercury vapour at a pressure $P_3$ equals the equilibrium pressure of the mercury at the temperature $T_3$, to obtain a sample of type p having a junction of type p-n.

It is possible in certain cases to subject the samples of type n obtained at the end of the first stage of the above mentioned process, directly to the third stage of this process and to obtain thus samples of type p having junctions of type p-n.

It is also possible, in order to form junctions of type p-n according to the third stage of the process according to the invention, to use sometimes directly the monocrystalline ingots of type p obtained by means of the metallurgical treatment described briefly above, and which are commercially available but this possibility constitutes the exception for the reason of reproducibility of the junctions.

Concerning the first stage of the treatment according to the invention, which stage permits samples of type n to be obtained, having a low concentration of charge carriers, the precise value of $P_1$ and $T_1$ can be determined by using the experimental diagram of FIG. 1 in which the straight lines have been shown connecting the points which correspond to the same values of the electron concentration for all the couples of values of the pressure of mercury (on the ordinate, graduated in log $p_{atm}$) and of the temperature (on the abscissa, graduated in $1000/T$ with T expressed in ° K.).

It has been found that the best results have been obtained in a zone delimited by two straight lines parallel to the ordinate axis and whose abscissa correspond respectively to 225 and 180° C.

Concerning the value of $t_1$ which increases as a function of the thickness of the samples being treated, experience has shown that this increase is substantially linear, the value of $t_1$ being 1 hour for a thickness equal to 10$\mu$ and 120 hours for a thickness equal to 2 mm.

In practice, it is convenient to use samples in the form of plates whose dimensions are 8 mm. x 4 mm. x 2 mm. The time $t_1$ is then chosen equal to 120 hours. Supposing that the temperature $T_1$ is chosen equal to 200° C. (point 2.12 on the abscissa), the pressure $P_1$ can then be determined on the diagram of FIG. 1 as a function of the desired concentration of carriers.

The thermal treatment corresponding to this first stage of the process, according to the invention, can be carried out in a sealed tube 1 (FIG. 4) containing a sample 2 and placed inside an oven 3 whose heating elements 4 are disposed so that a hot zone is obtained in which the sample to be treated is placed and a cooler zone is obtained in which a sample of mercury 5 is placed, the temperature of this cooler zone being such that the equilibrium pressure of the mercury inside the tube 1 is equal to the pressure $P_1$ desired.

FIG. 4 shows the temperature gradient to which the sealed tube 1 is subjected (the temperature $\theta$ being shown as a function of the length $l$ of the tube).

The samples obtained from this first stage of the process according to the invention can be used directly, in particular in the manufacture of photoconductor detectors.

They can also be subjected to the above mentioned second stage of the process of treatment, according to the invention, in order to obtain samples of type p having a high electron concentration. In the diagram of FIG. 2, the electron density $\epsilon$ (expressed in number of acceptors per cm.$^3$) has been shown as a function of the duration $t_2$ of the treatment for three values of $T_2$, namely 300, 400 and 500° C. This treatment is very short and its duration does not exceed in any case 30 minutes. The value of the pressure $P_2$ is practically not important so long as it is comprised between 0.2 and 1 atmosphere.

As mentioned previously, it seems paradoxical that such a short heat treatment (not exceeding 30 minutes) can cause such profound changes in the sample. The following brief physical explanation is intended to help to clarify this point, but the scope and validity of the invention are in no way tied to this explanation.

It is believed that this profound change is associated with a short distance displacement of the tellurium atoms in the neighborhood of the gaps in the mercury. Before the reheating, these atoms form covalent bonds between each other, and a very short reheating is sufficient to break these bonds; this explains the rising part of the curves of FIG. 2. If the reheating is prolonged, the diffusion of mercury atoms from the vapour becomes considerable, which explains the falling part of the curve.

FIG. 2 represents the case of pure HgTe, that is, the case in which $x=0$. By way of comparison, the following table gives the values of $\epsilon$ for four different values of $x$ for a heat treatment of 20 minutes at 500° C.:

| | |
|---|---|
| $x=0$ | $\epsilon=5\times10^{18}$ |
| $x=0.24$ | $\epsilon=8\times10^{17}$ |
| $x=0.34$ | $\epsilon=7\times10^{17}$ |
| $x=0.36$ | $\epsilon=4\times10^{17}$ |

Of the above four cases, the case $x=0.24$ has the most widely extended applications in the field of optoelectronics.

From an experimental point of view, it is possible to use the apparatus described above in connection with FIG. 4 for this second stage.

The samples of type p thus obtained can, either be used directly, in particular for the manufacture of diodes, or be subjected to the third stage of the process according to the invention in order to form the p–n junction.

This stage has for its effect the transformation of a surface layer of thickness $d$ of the sample into a substance of electronic type opposite to that of the body of the sample, that is to say to make a layer of type n appear on the sample of type p.

This third stage is characterized by the conditions $T_3$, $t_3$, $P_3$ which can be determined by means of the diagram of FIG. 3. In this diagram, two curves have been shown connecting the points whose coordinates, for a treatment duration of one hour and of two hours respectively, these curves giving the thickness $d$ of the layer of type n as a function of the treatment temperature $T_3$. The pressure $P_3$ is maintained at the desired value by providing at the interior of the treatment zone a sample of mercury at the temperature $T_3$. The value of $P_3$ is comprised between 0.2 and 2.1 atmospheres.

From an experimental point of view, the apparatus of FIG. 4 can again be used.

In certain cases, a foreign impurity such as indium can be used as the donor inside the tube 2.

For using in practice the junctions thus prepared, it is necessary to subject them previously to surface treatments by pickling. Moreover, it is necessary to place contacts for carrying electric current which can resist temperatures of the order of 77° K. in which these junctions are generally used.

These surface treatments, which have for their purpose either to obtain very low speeds of surface recombination of the minority charge carriers, or to proceed with attacks to controllable depths, are carried out by means of two acid solutions.

The first of these solutions contains fuming hydrochloric acid ($D=1.19$), nitric acid (36° Bé.) and a few traces of fuming nitric acid (40° Bé). Good results have been obtained with solutions containing ⅔HCl and ⅓$HNO_3$. The sample is then rinsed by diluting the solution progressively with absolute ethyl alcohol until the rinsing solution reaches 100% absolute alcohol.

The second of these solutions is a mixture of absolute ethyl alcohol and bromine. The rinsing process is the same as that previously described.

The resistance of the electric current carrying contacts to be placed on the p-n parts of the junction is assured by depositing metals at the appropriate places, either by evaporation or by an electrolytic method. Thus, on the p zone, the metal to be deposited is chosen among gold or platinum, on the n zone, the metal to be deposited is chosen among gold, platinum or indium or again among the eutectics gallium-indium, mercury-indium, etc.

The method of putting the contacts in place can consist, for example, in an electrolytic deposit, on the n and p parts of a layer of gold of thickness equal to a few microns and in a weld having indium or indium-silver on the metal parts.

In the interval of composition $0<x<0.4$, the exact conditions of the three treatments of the process do not depend greatly on $x$. Thus, no process value of $x$ has geen given in the foregoing. Nevertheless, in the following examples, which are given by way of example and are not intended to limit the invention in any way, the composition of the alloy has been chosen with $x=0.25$.

EXAMPLE 1

Some plates of 8 x 4 x 2 mm., cut in a monocrystal previously purified by zone melting, are subjected to a thermal treatment at a temperature $T_1=200°$ C., for a duration $t_1=120$ hours and under a vapour pressure of mercury $P_1=0.01$ atmosphere. At the end of the treatment, these plates are of type n, their electric concentration is about $10^{15}$ per cm.³ at 77° K., and they can be used directly as photoconductor detectors operating at a wave length in the neighborhood of 10 microns.

EXAMPLE 2

In order to prepare a strongly doped alloy of type p, the plates obtained from the treatment of Example 1 are subjected to a further thermal treatment under the following conditions: $T_2=500°$ C., $t_2=15$ min., the vapour pressure of mercury $P_2=0.2$ atm. The plates thus treated are of type p and their concentration of holes is about $10^{18}$ per cm.³ at 77° K.

EXAMPLE 3

As an example of the preparation of an alloy of type p, for the case $x=0$, that is, for the case of pure HgTe, the plates obtained from a treatment analogous to that of Example 1 are subjected to a further thermal treatment in the following conditions: $T_2=400°$ C., $t_2=30$ min., the vapour pressure of the mercury $P_2=0.2$ atm. The plates thus treated are of type p, and their concentration of holes is about $4\times10^{19}$ per cm.³ at 77° K.

EXAMPLE 4

In order to prepare a p-n junction, the plates prepared according to Example 2 are subjected to a further reheating in the following conditions: $T_3=350°$ C., $t_3=1$ hour, $P_3$ (the vapour pressure of mercury)$=0.2$ atm.

The surface layer of type n thus formed has a thickness of 30 microns at 77° K. The plate is cut to the desired dimensions, for example 0.3 mm. x 0.3 mm., and is pickled with a solution containing fuming hydrochloric acid ($D=1.19$), nitric acid at 36° Bé. and traces of fuming nitric acid at 40° Bé. (the proportions used being ⅔HCl and ⅓$HNO_3$); the ohmic contacts are then formed on the zones p and n, by electrolytic depositions of a layer of gold followed by a weld with indium. The p-n junction thus formed can be used as a photovoltaic detector or as an emitter.

EXAMPLE 5

The plates of type n prepared according to Example 1 and having undergone the surface treatments according to Example 4, are subjected to a single thermal treatment, namely to the second and third stages of the process according to the invention both at the same time, which has for its effect, simultaneously, On the one hand, due to the high temperature T (400° C.) to convert the plate to type p in its mass and, On the other hand, due to the relatively long time $t_2$ (2 hours) and the relatively high vapour pressure $P_2$ (2.00 atm.), to produce a surface layer of type n, whose thickness at 77° K. is 90$\mu$.

The contacts are formed as in Example 4.

Needless to say, the invention is not limited to the particular applications nor to the particular embodiments or examples specifically indicated above; on the contrary, numerous modifications are possible.

What we claim is:

1. Process of preparing a p-n junction in semiconductor alloys of mercury telluride and cadmium telluride of general formula $Hg_{1-x}Cd_xTe$ where $x$ is comprised between 0 and 0.4 from a previously purified monocrystalline sample of said alloy, said process comprising the steps of:

(A) subjecting said sample to a thermal treatment of duration $t_1$, which increases with the thickness of said sample, at a temperature $T_1$ lower than 350° C., in the presence of mercury vapour at a pressure $P_1$ comprised between $6\times10^{-3}$ and $1.5\times10^{-2}$ atmospheres, to obtain a sample of type n having a low concentration of charge carriers;

(B) subjecting said sample of type n to a thermal treatment of duration $t_2$ comprised between 1 and 30 minutes, at a temperature $T_2$ greater than 300° C., in the presence of mercury vapour at a pressure $P_2$ comprised between 0.2 and 1 atmosphere, to obtain a sample of type p having a high concentration of charge carriers;

(C) subjecting said sample of type p to a thermal treatment of duration $t_3$ comprised between 1 and 3 hours, at a temperature $T_3$ comprised between 300 and 500° C. but lower than said temperature $T_2$, in the presence of mercury vapour at a pressure $P_3$ equal to the equilibrium pressure of the mercury at said temperature $T_3$, to obtain a sample of type p having a junction of type p-n.

2. Process according to claim 1 in which said temperature $T_1$ is comprised between 180 and 225° C.

3. Process according to claim 1 in which said temperature $T_2$ is in the neighbourhood of 400° C.

4. Process according to claim 1 in which said temperature $T_2$ is in the neighbourhood of 500° C.

5. Process according to claim 1 in which said duration $t_1$ increases linearly as a function of the thickness of sample being treated, said duration $t_1$ being 1 hour for a thickness of 10$\mu$ and being 120 hours for a thickness of 2 mm.

6. Process according to claim 1 in which said pressure $P_3$ is comprised between 0.2 and 2.1 atmospheres.

7. Process according to claim 1 including the further steps of:

(A) subjecting said sample of type p having junctions of type p-n to a surface treatment which comprises the steps of:

(a) treating the sample with a solution of hydrochloric and nitric acids, (b) and then treating the sample with a solution of absolute ethyl alcohol and bromine, (B) and then forming contacts on said sample for carrying electric current.

References Cited

UNITED STATES PATENTS 3,312,571 4/1967 Ruehrwein ---------- 148—175

L. DEWAYNE RUTLEDGE, Primary Examiner

R. A. LESTER, Assistant Examiner

U.S. Cl. X.R.

148—1.5, 186